United States Patent [19]

Robeson et al.

[11] Patent Number: 4,698,390
[45] Date of Patent: Oct. 6, 1987

[54] MISCIBLE BLENDS OF POLYCARBONATE WITH VINYL CHLORIDE DERIVED POLYMERS

[75] Inventors: Lloyd M. Robeson, Whitehouse Station; James E. Harris; James H. Kawakami, both of Piscataway; Louis M. Maresca, Belle Mead, all of N.J.

[73] Assignee: Amoco Corporation, Chicago, Ill.

[21] Appl. No.: 851,280

[22] Filed: Apr. 10, 1986

Related U.S. Application Data

[63] Continuation of Ser. No. 591,606, Mar. 20, 1984, abandoned.

[51] Int. Cl.$^4$ .............................................. C08F 8/00
[52] U.S. Cl. ..................................... 525/133; 525/146; 525/147; 525/150; 525/151
[58] Field of Search .............. 525/133, 146, 147, 150, 525/151

[56] References Cited

U.S. PATENT DOCUMENTS

| | | | |
|---|---|---|---|
| 3,169,121 | 2/1965 | Goldberg | 260/47 |
| 3,312,660 | 4/1967 | Kurkjy | 260/47 |
| 3,737,409 | 6/1973 | Fox | 260/49 |
| 3,879,347 | 4/1975 | Serini et al. | 260/47 XA |
| 4,005,037 | 1/1977 | Mietzsch et al. | 525/146 |
| 4,020,045 | 4/1977 | Baggett | 260/47 XA |
| 4,105,711 | 8/1978 | Hardt et al. | 525/146 |
| 4,260,731 | 4/1981 | Mori et al. | 528/173 |
| 4,267,303 | 5/1981 | Konig | 528/171 |
| 4,286,083 | 8/1981 | Kochanowski | 528/173 |
| 4,297,455 | 10/1981 | Lindner et al. | 525/439 |
| 4,313,873 | 2/1982 | Lim | 525/146 |
| 4,324,869 | 4/1982 | Robeson | 525/146 |
| 4,349,658 | 9/1982 | Mark et al. | 528/176 |
| 4,369,303 | 1/1983 | Mori et al. | 528/173 |
| 4,404,351 | 9/1983 | Kafer et al. | 528/174 |
| 4,499,257 | 2/1985 | Maresca . | |
| 4,594,404 | 6/1986 | Kawakami . | |

FOREIGN PATENT DOCUMENTS 0000547 2/1979 European Pat. Off. .

OTHER PUBLICATIONS

Volker Serini, *Angewandte Makrom. Chemie*, 55 (1976), pp. 175-189 (No. 855).
U.S. patent application Ser. No. 485,945, filed Apr. 18, 1983, Board of Appeals 10-86.
U.S. patent application Ser. No. 486,018, filed Apr. 18, 1983, abdn. 12/83.
U.S. patent application Ser. No. 591,454, filed on an even date herewith.

*Primary Examiner*—Lucille M. Phynes
*Attorney, Agent, or Firm*—Donald M. Papuga; William H. Magidson; Ralph C. Medhurst

[57] ABSTRACT

A molding composition containing a compatible blend of (i) a polycarbonate having repeating units derived from bis-(3,5-dimethyl-4-hydroxyphenyl)sulfone (TMBS), optionally a dihydric phenol such as 2,2-bis(4-hydroxyphenyl)propane (Bisphenol A) and a carbonate precursor, and (ii) a vinyl chloride derived polymer.

4 Claims, No Drawings

MISCIBLE BLENDS OF POLYCARBONATE WITH VINYL CHLORIDE DERIVED POLYMERS

This application is a continuation of prior U.S. application Ser. No. 591,606, filing date Mar. 20, 1984, now abandoned.

BRIEF SUMMARY OF THE INVENTION

1. Technical Field

This invention relates in general to moldable and compatible blend compositions and in particular to moldable and compatible blends of (i) a polycarbonate containing repeating units of the residues of bis-(3,5-dimethyl-4-hydroxyphenyl) sulfone (TMBS), optionally a dihydric phenol such as 2,2-bis-(4-hydroxyphenyl)propane (Bisphenol A), and a carbonate precursor, and (ii) a vinyl chloride derived polymer.

2. Background of the Invention

Polycarbonates in general are derived from the reaction of one or more dihydric phenols such as Bisphenol A with a carbonate precursor, particularly phosgene. These polycarbonates are high temperature, high performance thermoplastic polymers with a good combination of thermal and mechanical properties. Polycarbonates also have good processability which allows them to be molded into a variety of articles.

However, such polycarbonates do not exhibit miscibility with vinyl chloride derived polymers. As a typical illustration, a Bisphenol A polycarbonate commercially available from the General Electric Company, Pittsfield, Mass. as Lexan 101 does not exhibit miscibility with poly(vinyl chloride) PVC. This deficiency is of particular importance to end-use applications of vinyl chloride derived polymers. Vinyl chloride derived polymers such as poly(vinyl chloride) PVC generally exhibit low heat distortion temperatures and therefore have a restrictive range of high temperature end-use applications. It would be highly desirable to increase the heat distortion temperature of vinyl chloride derived polymers and thereby provide said polymers with a broader range of higher temperature end-use applications.

It has been found as a result of this invention that polycarbonates having repeating units derived from bis(3,5-dimethyl-4-hydroxyphenyl)sulfone (TMBS) exhibit a high degree of miscibility with vinyl chloride derived polymers such as poly(vinyl chloride) PVC and, therefore, act as heat distortion temperature builders for the vinyl chloride derived polymers. The TMBS containing polycarbonates exhibit a higher glass transition temperature than corresponding polycarbonates which do not contain repeating units derived from TMBS. Therefore, the TMBS containing polycarbonates are also highly efficient heat distortion temperature builders for vinyl chloride derived polymers.

In general, while the excellent miscibility of TMBS containing polycarbonates and vinyl chloride derived polymers is completely unexpected, it is possible that such miscibility can be attributable at least in part to polar attractions between the sulfone groups of the polycarbonate and the chlorinated carbon groups of the vinyl chloride derived polymers. Other factors not completely understood may also contribute to the unexpected excellent miscibility exhibited by the blends of this invention. Such factors may include weak specific interactions between the carbonate carboxyl groups and the alpha hydrogen of poly (vinyl chloride) PVC. The tetramethyl substitution of TMBS may offer a closer balance of the dispersive forces of the blend constituents thereby enhancing miscibility. However, all of these possibilities are speculative.

DISCLOSURE OF THE INVENTION

This invention relates to moldable and compatible blends of TMBS containing polycarbonates and vinyl chloride derived polymers which possess superior physical properties. In particular, this invention relates to a molding composition comprising a compatible blend of: (a) a polycarbonate containing repeating units (I) having the formula

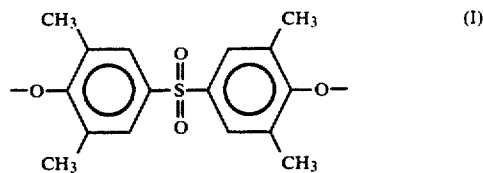

and optionally repeating units (II) having the formula

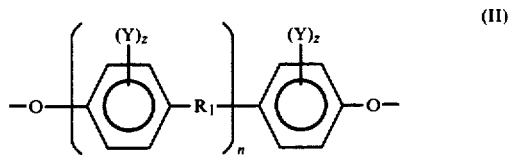

in which repeating units (I) and optionally repeating units (II) are connected by interbonding units derived from a carbonate precursor, wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated hydrocarbon radical, particularly an alkylene or alkylidene radical having from 1 to 6 carbon atoms or a cycloalkylidene or cycloalkylene radical having up to and including 9 carbon atoms, O, CO, $SO_2$, S or a direct bond, with the proviso that when $R_1$ is $SO_2$ then repeating unit (II) is not the same as repeating unit (I); and (b) a vinyl chloride derived polymer.

The TMBS containing polycarbonates employed in the blend compositions of this invention exhibit excellent miscibility with vinyl chloride derived polymers and offer higher glass transition temperatures than conventional Bisphenol A polycarbonates of the prior art. Therefore, the TMBS containing polycarbonates employed in the blend compositions of this invention are also highly efficient heat distortion builders for vinyl chloride derived polymers.

DETAILED DESCRIPTION

The polycarbonates employed in the blends of this invention can be produced by either conventional solution or interfacial polymerization techniques known in the art for the manufacture of polycarbonates, such as described in U.S. Pat. No. 3,737,409. The solution process involves reacting the carbonate precursor, e.g., phosgene, with bisphenol compounds which give repeating units (I) and (II), for example, bis-(3,5-dimethyl-4-hydroxy phenyl)sulfone and 2,2-bis(4-hydroxyphenyl)propane. The reaction medium may be in a single organic phase employing a compatible solvent such as a halohydrocarbon and utilizing a base, such as pyridine, to accept by-product hydrogen chloride. Alternatively, interfacial polymerization techniques may be employed wherein the reaction media is composed of an organic phase and an alkaline aqueous phase. A phase transfer catalyst, that is, an acid acceptor, such as triethylamine may be used to accept the by-product hydrogen chloride from the condensation in the organic phase and to transfer the hydrogen chloride to the alkaline aqueous phase where it is neutralized and the catalyst is regenerated to its unprotonated form to accept additional hydrogen chloride. Additionally, chain length regulators such as para-tertiary-butyl phenol may be employed to limit the molecular weight and thus the viscosity of the polymer. Examples of the interfacial polymerization process are described in U.S. Pat. No. 3,646,402, issued Feb. 29, 1972, and by P. W. Morgan, Condensation Polymers By Interfacial and Solution Methods (Interscience 1965).

The solution and interfacial polymerization techniques known in the art for the manufacture of polycarbonates can be applied equally in the practice of the instant invention, except as hereinafter modified.

The utilization of chain stoppers in the manufacture of polycarbonates in very well known in the art. Suitable chain stoppers include mono functional carboxylic acids or hydroxy compounds such as phenol, para-tertiary butylphenol, benzoic acid, para-tertiary butylbenzoic acid, and the like. The choice of a chain stopper is not critical to practice of the invention, any suitable mono-carboxylic acid or mono-hydroxy compound may be employed. The chain stopper unit, because it stops the growth of the polymer, becomes the terminal unit of the polycarbonate.

Any conventional organic solvent that will solvate the product polymer may be used in the solution process, so long as the solvent is chemically unreactive in the polycarbonate polymerization. A preferred group of solvents is the chlorinated aliphatic hydrocarbons of 1-4 carbons such as dichloromethane, chloroform, carbon tetrachloride, dichloroethane, trichloro- ethane, trichloroethylene, tetrachloroethylene, and mixtures thereof. Another desirable class of solvents is the aromatic hydrocarbons and halogenated aromatic hydrocarbons such as toluene, monochlorobenzene, dichlorobenzene, and mixtures thereof. Preferred solvents are the chloromethanes and especially dichloromethane. The solvents used in a solution polymerization process are preferably water-free so as to avoid side reactions of the carbonate precursor.

The acid acceptor employed can be either an organic or an inorganic acid acceptor. A suitable organic acid acceptor is pyridine or a tertiary amine which includes such materials as triethylamine, dimethylaniline, tributylamine, etc. The inorganic acid acceptor can be one which can be either a hydroxide, a carbonate, a bicarbonate, or a phosphate of an alkali or alkaline earth metal.

The interfacial process involves the utilization of an organic phase and an aqueous phase. In carrying out the interfacial process, it is desirable that the organic solvent chosen be immiscible with water. The quantity of organic solvent and the concentration of the reactants in the solvent are not critical except that sufficient solvent should be present to dissolve the product polymer. An amount of dichloromethane sufficient to form a product polymer solution of about 30 weight percent polymer is generally the minimum amount of solvent for this particular system. Other materials such as chain length regulators, that is the chain stoppers, catalysts, foam depressants, and the like can also be present in the organic phase.

The aqueous phase is normally basic to the extent of a pH of at least about 8 and preferably at least about 9 prior to reaction. During reaction, the pH may vary within the range of about 7-12, but preferably is kept above 7 by the addition of base such as sodium hydroxide when needed.

The reactants, in an interfacial polymerization reaction, are provided in the aqueous phase and are referred to herein as bisphenolates. These reactants are normally formed by dissolving the bisphenols in water with an inorganic base, for example, an aqueous or alkaline earth metal hydroxide, preferably an alkali metal hydroxide, and most preferably, sodium hydroxide. In the preferred embodiment, the sodium bisphenolate of bis-(3,5-dimethyl-4-hydroxyphenyl)sulfone and the sodium bisphenolate of 2,2-bis-(4-hydroxyphenyl)propane are utilized in the aqueous phase. The concentrations of the bisphenolates in the aqueous phase are not critical to the present invention. Concentrations up to the solubility limits of the bisphenol are preferred, such that excess amounts which will form a slurry are less desirable. A representative range for bisphenol-A is about 2 to 15 weight percent and preferably about 3 to 10 weight percent. Because the monomer/monomer ratio will affect the properties of the resulting polycarbonate, the concentration of bis-(3,5-dimethyl-4-hydroxyphenyl)-sulfone is adjusted with regard to the amount of bisphenol-A utilized, for the purposes of optimizing the properties of the resulting polymer. Other materials may be present in the aqueous phase in addition to the bisphenolates and excess base such as anti-oxidants, foam depressants, catalysts and chain stoppers.

The processes for making the polycarbonates, whether by solution polymerization or by interfacial polymerization, may be carried out at ambient temperature conditions, such as typical room temperature conditions, i.e. 23°-25° C. Higher and lower temperatures may be employed, taking into regard the problems of stabilizing an emulsion at temperatures above or below ambient temperatures. The solution process allows the use of a wide temperature range, no particular temperature being absolutely critical to the practice of the solution process.

A preferred feature in making the polycarbonates employed in the blends of this invention is that the requisite stoichiometric amount of the bisphenol compound which gives repeating units (II) described in the formula above, for example, Bisphenol-A, is withheld from the initial polymerization reaction. That is, at least 15 weight percent of the total Bisphenol-A added is initially withheld from the reaction and added at the last stages of polymerization. This procedure yields a polymer wherein the terminal portions of the polymer contain a predominant amount of the Bisphenol-A monomer to the exclusion of the TMBS monomer. This is described more fully in copending U.S. patent application Ser. No. 485,945, filed Apr. 18, 1983, and incorporated herein by reference.

This reserved amount is typically added to the polymerization reaction when the desired polymer growth has been attained and the chain regulator, or chain stopper, is to be added for polymer length regulation. Thus, the remaining Bisphenol-A is added concurrently with the chain regulator, e.g., p-t-butylphenol, and additional carbonate precursor, e.g., phosgene, to assure their reaction to lengthen and terminate the polymer. The amount of phosgene added is equivalent to that amount which is necessary to add the Bisphenol-A and the chain regulator to the polymer. If the chain regulator is added before the final addition of Bisphenol-A, the terminated polymer would be unable to react with the Bisphenol-A. Thus, it is important in this preferred embodiment not to chain stop the polymer before the last addition of Bisphenol-A used in the termination of the polymer.

Another preferred feature in making the polycarbonates employed in the blends of this invention involves reacting, for example, 2,2-bis-(4-hydroxyphenyl) propane (Bisphenol A) dichloromate with bis-(3,5-dimethyl-4-hydroxyphenyl) sulfone (TMBS) or, in the alternative, 2,2-bis-(4-hydroxyphenyl) propane (Bisphenol A) with bis-(3,5-dimethyl-4-hydroxyphenyl) sulfone (TMBS) dichloroformate. This procedure yields a polymer having predominantly ordered, alternating repeating units of the above monomers. This is described more fully in copending U.S. patent application Ser. No. 591,539 now U.S. Pat. No. 4,594,404, filed on an even date herewith, and incorporated herein by reference.

The reactant bis-(3,5-dimethyl-4-hydroxyphenyl) sulfone (TMBS) which gives repeating units (I) hereinabove can be prepared according to the process described in U.S. Pat. No. 3,383,421.

Suitable bisphenol compounds which geve repeating units (II) having the formula described above, in addition to 2,2-bis-(4-hydroxyphenyl) propane (Bisphenol A) and bis-(4-hydroxyphenyl) sulfone, include hydroquinone, 4,4'-biphenol, bis-(4-hydroxyphenyl) methane, 2,2-bis(4-hydroxy-3-methylphenyl) propane, 4,4-bis(4-hydroxyphenyl) heptane, 2,2-bis-(3,5-dichloro-4-hydroxyphenyl) propane, 2,2-bis-(3,5-dibromo-4-hydroxyphenyl) propane and bis-(3-chloro-4-hydroxyphenyl) methane. Other bisphenol compounds are also available and are disclosed in U.S. Pat. Nos. 2,999,835, 3,028,365 and 3,334,154.

The carbonate precursor employed in the practice of this invention to give the interbonding units can be either carbonyl halide or a haloformate. The carbonyl halides which can be employed herein are carbonyl bromide, carbonyl chloride, carbonyl fluoride, etc. or mixtures thereof. The haloformates suitable for use herein include bishaloformates of dihydric phenols (bischloroformates of hydroquinone, Bisphenol A, etc.). While other carbonate precursors will occur to those skilled in the art, carbonyl chloride, also known as phosgene, is preferred and gives interbonding units having the formula

Also preferred are interbonding units derived from Bisphenol A dichloroformate having the formula

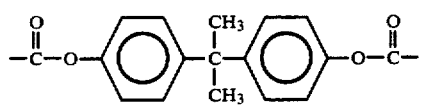

The polycarbonate reaction between the reactants which give repeating units (I) hereinabove, repeating units (II) hereinabove and interbonding units derived from a carbonate precursor proceeds on a stoichiometric basis such that the desired polycarbonate is formed having the desired molecular weight. Stoichiometry is not critical and the only requirement is that the amounts employed are sufficient to form the polycarbonate. By varying the amounts of reactants, one can vary the polycarbonate polymer ultimately produced and its properties.

The polycarbonates employed in the blends employed in the blends of this invention preferably contain from about 20 weight percent to about 100 percent of repeating units (I) hereinabove, more preferably from about 25 weight percent to about 95 weight percent, and most perferably from about 40 weight percent to about 60 weight percent. The polycarbonates employed in the blends of this invention preferably contain from about 0 weight percent to about 80 weight percent of repeating units (II) hereinabove, more preferably from about 5 weight percent to about 75 weight percent, and most preferably from about 40 weight percent to about 60 weight percent. In general, those polycarbonates containing the higher weight percentages of repeating units (I) will preferably have the better miscibility with vinyl chloride derived polymers and the higher glass transition temperatures.

Conventional procedures may be used for the addition of TMBE, Bisphenol A, carbonate precursor and the chain regulator. Preferably, TMBS and optionally Bisphenol A are added neat in the solution process or as disodium salts dissolved in water in the interfacial process to the system. In the solution process, the chain stopper can be added with or subsequently to the addition of the TMBS and Bisphenol A. Then the carbonate precursor such as phosgene can be bubbled through the solution and polymerization continued. In the interfacial process, the alkali salt of the chain stopper can be added with the TMBS and Bisphenol A, or the hydroxyl form can be added neat or in solution subsequent to phosgene addition. With additional stirring, the final polymerization phase is completed.

The structure of the polycarbonate polymers employed in the blends of this invention can be modified to some extent by including in the polymerization reaction other dihyroxy compounds, typically not more than about 10 weight percent of the total weight of the polycarbonate. For example, one might include along with Bisphenol A and bis-(3,5-dimethyl- 4-hydroxyphenyl)-sulfone (TMBS), other dihydroxy compounds either as such or in the haloformate form, as a partial substitute and modifier of the polymeric structure, without adversely affecting the overall properties of the polymeric sturcture. For example, such dihydroxy compounds as ethylene glycol, propylene glycol, 1,4-butylene glycol, neopentyl glycol and the like can be included in the polymerization reactions to manufacture the polycarbonate polymers employed in the blends of this invention.

Polymer recovery can be achieved by processes well known in the art to recover a moldable polycarbonate such as by coagulation and filtration.

The molecular weight of the polycarbonate polymers utilized in the blends of this invention is indicated by reduced viscosity in indicated solvents. As well understood in the art, the viscosity of a resin solution bears a direct relationship to the weight average molecular size of the polymer chains, and is typically the most important single property that can be used to characterize the degree of polymerization. The reduced viscosity assigned to the polycarbonate polymers utilized in the blends of this invention is therefore to be understood as significant in reflecting molecular size rather than consideration concerning the viscosity per se. Most of these polycarbonate polymers have indicated ready solubility in N-methylpyrrolidinone, chloroform, or tetrachloroethane or other similar solvent.

Reduced viscosity (R.V.) as used herein was determined by dissolving a 0.2 or 0.5 gram sample of polycarbonated polymer in the indicated solvent, i.e., chloroform, contained in a 100 milliliter volumetric flask so that the resultant solution measured exactly 100 milliliters at 25° C. in a constant temperature bath. The viscosity of 3 milliliters of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{C \cdot t_o}$$

wherein:
$t_o$ is the efflux time of the pure solvent:
$t_s$ is the efflux time of the polymer solution: and
C is the concentration of the polymer solution expressed in terms of grams of polymer per 100 milliliters of solution.

The polycarbonates utilized in the blends of this invention are characterized as linear thermoplastic structures which have a relatively high molecular weight, that is, a reduced viscosity determined at a concentration of 0.5 g/100 ml in chloroform at 25° C. of at least 0.3 dl/g, preferably at least 0.5 dl/g and, typically not exceeding about 1.5 dl/g. These polymers are exceptionally tough, are miscible with vinyl chloride derived polymers, and offer higher heat distortion temperatures than conventional Bisphenol A polycarbonates of the prior art.

The vinyl chloride derived polymers suitable for use in the blends of this invention are polyvinyl chloride and copolymers of vinyl chloride such as copolymers of vinyl chloride with olefinically unsaturated polymerizable compounds which contain at least 50 percent by weight of polymerized vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and α-alkyl-acrylate and theri alkyl esters, amides and nitriles, methacrylic acid, maleic acid or anhydride, methyl methacrylate, ethyl acrylate, 2-ethylhexylacrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,2]-hept-2-ene and bicyclo-[2,2,1]hepta-2,5-diene. Polymerized vinyl acetate may be hydrolyzed to provide vinyl alcohol moieties in the polymer.

These vinyl chloride derived polymers are well known in the art and can be prepared by the usual methods of solution, emulsion, suspension, bulk or mass polymerization.

Vinyl chloride derived polymers which have an average molecular weight of from about 10,000 to about 150,000 are preferred. Poly (vinyl chloride) homopolymer having an average molecular weight in the range of 60,000 and obtained from Union Carbide Corporation, Danbury, Conn. as QYSA is a preferred vinyl chloride derived polymer for use in the blends of this invention.

The concentration of the polycarbonate and the vinyl chloride derived polymer in the moldable and compatible blends of this invention may vary widely depending upon the properties sought from the molded products made from the blends. The polycarbonate can preferably by employed in an amount of from about 5 weight percent to about 95 weight percent, more preferably from about 25 weight percent to about 75 weight percent, and most preferably from 40 weight percent to about 60 weight percent.

The moldable and compatible blends of the present invention can further include styrenic polymers as an ingredient therein. The styrenic polymers, i.e., styrene resins, suitable for use herein include polystyrene and styrene/acrylonitrile copolymers, especially ABS type polymers, the molecules of which contain two or more polymeric parts of different compositions that are bonded chemically. The ABS type polymers are preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

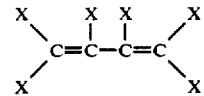

wherein X may be hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are the styrene, such as: styrene, 3-methylstyrene; 3,5-diethylstyrene, 4-n-propylstyrene, α-bromostyrene, dichlorostyrene, dibromostyrene, tetra-chlorostyrene, mixtures thereof, and the like. The preferred monovinylaromatic hydrocarbons used are styrene and/or a αmethylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 60% by weight or less of the total graft polymer composition. The monomers polymerized in the presence of the backbone, exemplified by styrene and acrylonitrile, comprises from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The styrenes may comprise from about 30 to about 80% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene/acrylonitrile copolymer. Also, there are occasions where a copolymer, such as α-methylstyrene/acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastiomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

The concentration of the styrenic polymer in the miscible blends of this invention may vary widely depending upon the properties sought from the molded products made from the blends. In the broadest sense, the styrenic polymer can be employed in an amout of from about 1 weight percent to about 50 weight percent or greater based on the total weight of the blend composition.

Blending may be done in the usual fashion, such as by simple mixing of powders of the polymers, though usually in an extruder mixer. The extruded product will be a melt mixture of the polycarbonate, the vinyl chloride derived polymer, and other optional ingredients. The extruded product can be pelleted and used as such in making molded articles of commerce by conventional techniques such as compression molding, thermoforming, blow molding and injection molding.

The mixture of the two polymers is usually effected above the melting temperatures of the polymers. Usually mixing is effected at a temperature below 220° C. for the blends containing vinyl chloride polymers.

The blends compositions of the plycarbonate and the vinyl chloride derived polymer may include typical additives commonly added to polymeric materials such as stabilizers, i.e., metal oxides such as zinc oxide, antioxidants, flame retardants, flow aids, pigments, and the like. The blends may be optionally used with reinforcing fibers and/or inorganic fillers. The reinforcing fiber includes fiberglass, carbon fibers, and the like, and mixtures thereof. The carbon fibers include those having a high Young's modulus of elasticity and high tensile strength. These carbon fibers may be produced from pitch, as described in U.S. Pats. Nos. 3,976,729; 4,005,183 and 4,026,788, for example. The particulate inorganic fillers which may be used include wollastonite, calcium carbonate, glass beads, talc, micam, clay, quartz and the like, or mixtures thereof.

The fiber reinforcement, filler or combinations thereof, can be utilized in amounts of from 0 to about 50 weight percent, preferably from about 10 to about 35 weight percent, of the total weight of the blend composition.

Additionally, polymers exhibiting mechanical compatibility with the blends described herein may also be included. Mechanical compatibility refers to a balance of mechanical properties, e.g., strength, toughness and the like, in miscible blend systems which is generally an average of the mechanical properties of the particular blend constituents. These polymers include polycarbonates including polyestercabonates, polyesters, polyarylates, poly(aryl ethers), poly(ether imides) and the like.

The moldable and compatible blends of this invention have heat distortion temperatures which allow for a broad range of end-use applications. Illustrative of such end-use applications include exterior siding, thermoformed panels, appliances requiring specific heat distortion temperatures, hot water pipe, containers for hot-fill applications or where boiling or hot water exposure is required. When styrenic polymers are included in the blended compositions of this invention, illustrative end-use applications can include appliance applications, boiling water exposure electrical/electronic parts exposed to higher temperatures, plating applications, and automotive applications.

as used in this invention, the glass transition temperature (Tg) of the polymers and blends herein has a direct correlation with the heat distortion temperature of the polymers. In general, the heat distortion temperature of the polymers and blends is typically 10° C. to 20° C. below the glass transition temperature (Tg) of the amorphous polymers and blends.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

The molded blend compositions prepared in the examples below were evaluated according to the following procedures:

| | |
|---|---|
| 1% Secant Modulus (psi): | ASTM D-638; |
| Tensile Strength (psi): | ASTM D-638; |
| Elongation at Break (%): | ASTM D-638; |
| Pendulum Impact Strength: (ft.lbs/in$^3$) | |

A steel pendulum is used, cylindrical in shape with a diameter of 0.83 inch and weighing 1.562 pounds; the striking piece, mounted almost at the top of the pendulum is a cylinder 0.3 inch in diameter; film speciments, 4 inches long, 0.125 inch wide and about 1 to 30 mils thick are clamped between the jaws of the tester so that te jaws are spaced 1 inch apart; the 0.125 inch width of the film is mounted vertically; the pendulum is raised to a constant height to deliver 1.13 foot pounds at the specimen; when the pendulum is relased the cylindrical striking piece hits the speciment with its flat end, breaks the film, and travels to a measured height beyond; the difference in the recovery height (i.e., the difference in the potential energy of the pendulum at the maximum point of the upswing) represents the energy absorbed by the specimen during the rupture; the impact strength, expressed in foot-pounds per cubic inch, is obtained by dividing the pendulum energy loss by the volume of the specimen.

EXAMPLE 1

To a 4-necked one liter flask fitted with a nitrogen/phosgene sparger (coarse), thermometer, reflux condenser, a 20% sodium hydroxide trap, and mechanical stirrer was added 38.25 grams (0.125 moles) of bis(3,5-dimethyl-4-hydroxyphenyl)sulfone(TMBS), 28.55 grams (0.125 moles) of 2,2-bis-(4-hydroxyphenyl)propane (Bisphenol A), 500 milliliters of dichloromethane, and 125 milliliters of pyridine.

After initial sparging with nitrogen for 15 minutes, the phosgene was turned on and the nitrogen turned off. The phosgene was added at an approximate rate of 0.2 grams per minute at room temperature for 2½ hours. A total of about 34 grams of phosgene was added. Excess phosgene was diluted with 200 milliliters of dichloromethane and filtered to remove the pyridine hydrochloride. The solution was washed several times with 5% hydrochloric acid and 0.25% acetic acid solution and then several times with distilled water. The mixture was then coagulated in 50/50 acetone/methanol, filtered, and washed with methanol. The polymer was dried overnight under vacuum and 50° C. The reduced viscosity at 25° C. in 0.5% chloroform solution was 1.0.

EXAMPLE 2

To a 4-necked one liter flask fitted with a nitrogen/phosgene sparger (coarse), thermometer, reflux condenser, a 20% sodium hydroxide trap, and mechanical stirrer was added 30.60 grams (0.10 moles) of bis(3,5-dimethyl-4-hydroxy-phenyl)sulfone (TMBS), 34.26 grams (0.15 moles) of 2,2-bis-(4-hydroxyphenyl) propane (Bisphenol A), 500 milliliters of dichloromethane, and 125 milliliters of pyridine.

After initial sparging with nitrogen for 15 minutes, the phosgene was turned on and the nitrogen turned off. The phosgene was added at an approximate rate of 0.2 grams per minutes at room temperature for 2½ hours. A total of about 34 grams of phosgene was added. Excess phosgene was removed with a nitrogen sparge. The polymer was diluted with 200 milliliters dichloromethane and filtered to remove the pyridine hydrochloride. The solution was washed several times with 5% hydrochloric acid and 0.25% acetic acid solution and then several times with distilled water. The mixture was then coagulated in 50/50 acetone/methanol, filtered, and washed with methanol. The polymer was dried overnight under vacuum and 50° C. The reduced viscosity at 25° C. in 0.5% chloroform solution was 0.78. The polymer was further dried under vacuum and 50° C. The reduced viscosity at 25° C. in 0.5% chloroform solution was 0.16.

EXAMPLE 3

To a 4-necked one liter flask fitted with a nitrogen/phosgene sparger (coarse), thermometer, reflux condenser, a 20% sodium hydroxide trap, and mechanical stirrer was added 38.25 grams (0.125 moles) of bis(3,5-dimethyl-4-hydroxy-phenyl) sulfone (TMBS), 28.55 grams (0.125 moles) of 2,2-bis-(4-hydroxyphenyl)propane (Bisphenol A), 500 milliliters of dichloromethane, and 125 milliliters of pyridine.

After initial sparging with nitrogen for 15 minutes, the phosgene was turned on and the nitrogen turned off. The phosgene was added at an approximate rate of 0.2 grams per minute at room temperature for 2½hours. A total of about 34 grams of phosgene was added. Excess phosgene was removed with a nitrogen sparge. The polymer was diluted with 200 milliliters dichloromethane and filtered to remove the pyridine hydrochloride. The solution was washed several times with 5% hydrochloric acid and 0.25% acetic acid solution and then several times with distilled water. The mixture was then coagulated in 50/50 acetone/methanol, filtered, and washed with methanol. The polymer was dried overnight under vacumm and 50° C. The reduced viscosity at 25° C. in 0.5% chloroform solution was 0.69.

EXAMPLE 4

Part A. Preparation of Bisphenol A Dichloroformate

To a 4-necked one liter flask fitted with a nitrogen/phosgene sparger (coarse), thermometer, dry ice condenser, 125 milliliter pressure equilibrated addition funnel, magnetic stirrer and a 15% sodium hydroxide trap was added 57.0 grams (0.25 moles) of 2,2-bis-(4-hydroxyphenyl)propane (Bisphenol A) and 400 milliliters of toluene. To the 125 milliliter pressure equilibrated addition funnel was added 63.5 grams (0.525 moles) of dimethylaniline diluted in 64 grams of toluene. A stopcock on the arm of the addition funnel was closed to prevent phosgene from reacting with the dimethylaniline.

After initial sparging with nitrogen for 15 minutes, the phosgene was turned on and the nitrogen turned off. The phosgene was added over a 1.5 hour period until about 66 grams (0.67 moles) of phosgene were added to the toluene/Bisphenol A mixture. The dimethylaniline was then added as rapidly as possible to the mixture. After the initial phosgene addition, the reaction mixture exothermed from a temperature of 23° C. to 26° C. and then further increased to a temperature of 30° C. over a one hour period. The reaction was carried out at a temperature of from 26° C.–30° C. for a total period of 3 hours after the initial phosgene addition. Additional phosgene was continuously added to the reaction mixture to compensate for any leaks in the system and to ensure complete reaction of the Bisphenol A. The total phosgene added was 132.5 grams (1.34 moles).

The large excess of phosgene was eliminated by nitrogen sparging for 24 hours after diluting the mixture with 200 milliliters of toluene. The dimethylaniline hydrochloride was filtered and the salt washed twice with a minimum volume of toluene. The combine dark solution was treated for one hour with 50 grams of silica gel 953 to yield a bright yellow clear solution which, after removal of toluene on a rotary evaporator at 70° C., yielded 96.1 grams of a yellow solid. Recrystallization from about 4 parts hexane to one part yellow solid and cooling overnight at 4.5° C. yielded 74 grams of white crystals having a melting point of 89°–90° C. and having the following formula

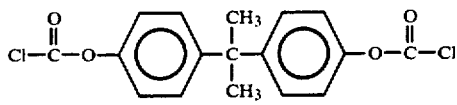

NMR analysis indicated that a pure material was obtained.

Part B. Preparation of Ordered Alternating Bisphenol A/TMBS Copolycarbonate From Bisphenol A Dichloroformate To a 4-necked two liter flask fitted with a thermometer, nitrogen inlet port, mechanical stirrer, claisen head 1000 milliliter addition funnel and reflux condenser was added 20 grams (0.25 moles) of 50% sodium hydroxide, 750 milliliters of distilled water and 30.63 grams (0.1 mole) of bis(3,5-dimethyl-4-hydroxyphenyl)sulfone (TMBS) with continuous stirring. To this solution was added 35.32 grams (0.1 mole) of Bisphenol A dichloroformate (prepared in Part A) dissolved in 500 milliliters of dichloromethane with ice cooling to keep the temperature at 25° C. The reaction mixture was stirred for 5 minutes afterwhich 2 milliliters of triethylamine were added with ice cooling to keep the temperature at 25° C. The reaction mixture was thereafter stirred for a period of 3.5 hours at a temperature of 25° C. At the end of the 3.5 hour reaction period, coagulation in methanol of a small sample indicated a high molecular weight. The reaction mixutre was washed with hydrochloric acid and distilled water and then coagulated in methanol. The polymer had the following formula

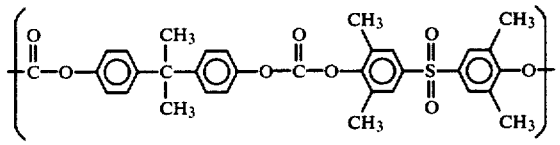

as determined by Carbon-13 and Proton-1 Nuclear Magnetic Resonance (NMR) spectroscopic analysis, and the reduced viscosity of the polymer at 25° C. in 0.5% chloroform solution was 1.12.

COMPARATIVE EXAMPLE A

A blend of 7 grams of Bisphenol A polycarbonate (commercially available from the General Electric Company, Pittsfield, Mass. as Lexan 101) and 7 grams of poly(vinyl chloride) PVC homopolymer (obtained from Union Carbide Corporation, Danbury, Conn. as QYSA) containing 3 weight percent of an organotin stabilizer (commercially available from Cincinnati Milacron Company, Cincinnati, Ohio as TM-181), based on the weight of the poly(vinyl chloride) PVC, was prepared in tetrahydrofuran/methylene chloride (2/1 weight ratio) at the boiling point of the tetrahydrofuran/methylene chloride solution. The resulting solution was cloudy and a thin film cast from the solution as opaque. The solution was then devolatilized in a vacuum oven, and the resulting solid product was compression molded in a 4 inch×4 inch×0.020 inch cavity mold at 185° C. The resulting molded product exhibited obvious phase separation as evidenced by the fact that the molded product was opaque. The molded product was thereafter tested for miscibility by a dynamic mechanical method (torsion pendulum) described in Rev. Sci. Instrum., L. E. Nielsen, 22, 690 (1951). A further description of the miscibility of polymer blends as determined by the dynamic mechanical method (torsion pendulum) can be found in "Polymer-Polymer Miscibility", Olabisi et al., p. 122-126, Academic Press, New York, 1979. The results show that the molded product prepared from the blend of Bisphenol A polycarbonate and poly(vinyl chloride) PVC had a glass transition temperature (Tg) of 76° C. The poly (vinyl chloride) PVC containing 3 weight percent of the organotin stabilizer had a glass transition temperature (Tg) of 74° C. using the same dynamic mechanical method (torsion pendulum). These results clearly demonstrate that bisphenol A polycarbonate exhibits a very low level of miscibility with poly(vinyl chloride) PVC and, therefore, does not act as a heat distortion builder for poly(vinyl chloride) as evidenced by essentially no increase in the glass transition temperature (Tg) of poly(vinyl chloride).

EXAMPLE 5

A blend of 7 grams of TMBS/Bisphenol A polycarbonate prepared in Example 2 and 7 grams of poly(vinyl chloride) PVC homopolymer (obtained from Union Carbide Corporation, Danbury, Conn. as QYSA) containing 3 weight percent of an organotin stabilizer (commercially available from Cincinnati Milacron Company, Cincinnati, Ohio as TM-181), based on the weight of the poly(vinyl chloride) PVC, was prepared in tetrahydrofuran. The resulting solution was clear and a thin film cast from the solution was transparent. The solution was then devolatilized in a vacuum oven, and the resulting solid product was compression molded in a 4 inch×4 inch×0.020 inch cavity mold at 185° C. The resulting molded product exhibited obvious miscibility as evidenced by the fact that the molded product was transparent. The molded product was thereafter tested for miscibility by a dynamic mechanical method (torsion pendulum) described in Rev. Sci. Instrum., L. E. Nielsen, 22 690 (1951). A further description of the miscibility of polymer blends as determined by the dynamic mechanical method (torsion pendulum) can be found in "Polymer-Polymer Miscibility", Olabisi et al., p. 122-126, Academic Press, New York, 1979. The results show that the molded product prepared from the blend of TMBS/Bisphenol A polycarbonate and poly(vinyl chloride) PVC had a single glass transition temperature (Tg) of 110° C. The poly(vinyl chloride) PVC containing 3 weight percent of the organotin stabilizer had a glass transition temperature (Tg) of 74° C. (see Comparative Example A) using the same dynamic mechanical method (torsion pendulum). The molded product prepared from the blend of TMBS/Bisphenol A polycarbonate and poly(vinyl chloride) PVC was also determined to have a single glass transition temperature (Tg) of 96° C. using a differential scanning calorimeter. The poly(vinyl chloride) PVC containing 3 weight percent of the organotin stabilizer had a glass transition temperature (Tg) of 69° C. using the same differential scanning calorimeter. These results clearly demonstrate that TMBS/Bisphenol A polycarbonate is very miscible with poly(vinyl chloride) PVC and is an excellent heat distortion builder for poly(vinyl chloride) PVC as evidenced by the increase in glass transition temperature (Tg) of the poly(vinyl chloride) PVC.

EXAMPLE 6

A blend of 7 grams of TMBS/Bisphenol A polycarbonate prepared in Example 3 and 7 grams of poly(vinyl chloride) PVC homopolymer (obtained from Union Carbide Corporation, Danbury, Conn. as QYSA) was prepared in tetrahydrofuran. The resulting solution was clear and a thin film cast from the solution was transparent. The solution was then devolatilized in a vacuum oven, and the resulting solid product was compression molded in a 4 inch×4 inch×0.020 inch cavity mold at 190° C. The resulting molded product exhibited obvious miscibility as evidenced by the fact that the molded product was transparent. The molded product was thereafter tested for miscibility by a dynamic mechanical method (torsion pendulum) described in *Rev. Sci. Instrum.*, L. E. Nielsen, 22, 690 (1951). A further description of the miscibility of polymer blends as determined by the dynamic mechanical method (torsion pendulum) can be found in "Polymer-Polymer Miscibility", Olabisi et al., p. 122-126, Academic Press, New York, 1979. The results show that the molded product prepared from the blend of TMBS/Bisphenol A polycarbonate and poly(vinyl chloride) PVC had a single glass transition temperature (Tg) of 119° C. The poly(vinyl chloride) PVC containing 3 weight percent of an organotin stabilizer had a glass transition temperature (Tg) of 74° C. (see Comparative Example A) using the same dynamic mechanical method (torsion pendulum). The molded product prepared from the blend of TMBS/Bisphenol A polycarbonate and poly(vinyl chloride) PVC was also determined to have a single glass transition temperature (Tg) of 125° C. using the technique of resilience minimum as described in "Polymer-Polymer Miscibility", Olabisi et al., p. 122-126, Academic Press, New York, 1979. The poly(vinyl chloride) PVC containing 3 weight percent of an organotin stabilizer had a glass transition temperature (Tg) of 75° C. using the same technique of resilience minimum. The molded product prepared from the blend of TMBS/Bisphenol A polycarbonate and poly(vinyl chloride) PVC was further determined to have a single glass transition temperature (Tg) of 101° C. using a differential scanning calorimeter. The poly(vinyl chloride) PVC containing 3 weight percent of the organotin stabilizer had a glass transistion temperature (Tg) of 69° C. (see Example 5) using the same differential scanning calorimeter. These results clearly demonstrate that TMBS/Bisphenol A polycarbonate is very miscible with poly(vinyl chloride) PVC and is an excellent heat distortion builder for poly(vinyl chloride) PVC as evidenced by the increase in glass transition temperature (Tg) of the poly(vinyl chloride) PVC.

EXAMPLE 7

A blend of 7 grams of TMBS/Bisphenol A polycarbonate prepared in Example 4 and 7 grams of poly(vinyl chloride) PVC homopolymer (obtained from Union Carbide Corporation, Danbury, Conn. as QYSA) containing 3 weight percent of an organotin stabilizer (commercially available from Cincinnati Milacron Company, Cincinnati, Ohio as TM-181), based on the weight of the poly(vinyl chloride) PVC, was prepared in tetrahydrofuran. The resulting solution was clear and a thin film cast from the solution was transparent. The solution was then devolatilized in a vacuum oven, and the resulting solid product was compression molded in a 4 inch×4 inch×0.020 inch cavity mold at 190° C. The resulting molded product exhibited obvious miscibility as evidenced by the fact that the molded product was transparent. The molded product was thereafter tested for miscibility by the resilience minimum technique using modulus-temperature data and resilience-temperature data as described in "Polymer-Polymer Miscibility", Olabisi et al., p. 122-126, Academic Press, New York, 1979. The modulus-temperature data and resilience-temperature data show that the molded product prepared from the blend of TMBS/Bisphenol A polycarbonate and poly(vinyl chloride) PVC had a single glass transition temperature (Tg) of 120° C. The poly(vinyl chloride) PVC containing 3 weight percent of the organotin stabilizer had a glass transition temperature (Tg) of 75° C. using the same resilience minimum technique. These reslults clearly demonstrate that TMBS/Bisphenol A polycarbonate is very miscible with poly(vinyl chloride) PVC and is an excellent heat distortion builder for poly(vinyl chloride) PVC as evidenced by the increase in glass transition temperature (Tg) of the poly(vinyl chloride) PVC.

EXAMPLE 8

A blend of 6 grams of the TMBS/Bisphenol A polycarbonate prepared in Example 1 and 6 grams of poly(vinyl chloride) PVC homopolymer (obtained from Union Carbide Corporation, Danbury, Conn. as QYSA) containing 3 weight percent of an organotin stabilizer (commercially available from Cincinnati Milacron Company, Cincinnati, Ohio as TM-181), based on the weight of the poly(vinyl chloride) PVC, was prepard in tetrahydrofuran. The resulting solution was partially cloudy and a thin film cast from the solution was partially transparent. The solution was then devolatilized in a vacuum oven, and the resulting solid product was compression molded in a 4 inch×4 inch×0.020 inch cavity mold at 190° C. The resulting molded product exhibited partial miscibility as evidenced by the fact that the molded product was partially opaque. The molded product was thereafter tested for miscibility by the resilience minimum technique using modulus-temperature data and resilience-temperature data as described in "Polymer-Polymer Miscibility", Olabisi et al., p. 122-126, Academic Press, New York, 1979. The modulus-temperature data and resilience-temperature data show that the molded product prepared from the blend of TMBS/Bisphenol A polycarbonate and poly(vinyl chloride) PVC had two distinct glass transition temperatures (Tg) of 90° C. and 110° C., thus indicating only partial miscibility. The molded product prepared from the blend of TMBS/Bisphenol A polycarbonate and poly(vinyl chloride) PVC was also tested for the mechanical properties designated in Table A below and the results of such testing are given in Table A. A molded product prepared in a similar manner from TMBS/Bisphenol A polycarbonate, which was employed in the above blend, was also tested for the mechanical properties designated in Table A and the results of such testing are given in Table A.

TABLE A

| Molded Product | 50% QYSA PVC 50% TMBS/Bisphenol A (50/50) Polycarbonate | 100% TMBS/Bisphenol A (50/50) Polycarbonate |
|---|---|---|
| 1% Secant | 247,000 | 232,000 |

TABLE A-continued

| Molded Product | 50% QYSA PVC 50% TMBS/Bisphenol A (50/50) Polycarbonate | 100% TMBS/Bisphenol A (50/50) Polycarbonate |
|---|---|---|
| Modulus (psi) Tensile | 7,330 | 10,200 |
| Strength (psi) Elongation at Break (%) | 13 | 9 |
| Pendulum Impact Strength (ft.lbs./in.$^3$) | 20 | 17 |
| Tg(°C.) | 90;110 | 205 |

EXAMPLE 9

A blend of 6 grams of TMBS/Bisphenol A polycarbonate prepared in Example 3, 3 grams of poly(vinyl chloride) PVC homopolymer (obtained from Union Carbide Corporation, Danbury, Conn. as QYSA) containing 3 weight percent of an organotin stabilizer (commercially available from Cincinnati Milacron Company, Cincinnati, Ohio as TM-181), based on the weight of the poly(vinyl chloride) PVC, and 3 grams of acrylonitrile/butadiene/styrene (commercially available from the Monsanto Company, St. Louis, Mo. as Lustran 752) was prepared in tetrahydrofuran. The resulting solution was devolatilized in a vacuum oven, and the resulting solid product was compression molded in a 4 inch×4 inch×0.020 inch cavity mold at 190° C. The molded product was tested for the mechanical properties designated in Table B below and the results of such testing are given in Table B.

TABLE B

| 1% Secant Modulus (psi): | 187,000 |
|---|---|
| Tensile Strength (psi): | 6,150 |
| Elongation at Break (%): | 7.7 |
| Pendulum Impact Strength: (ft.lbs./in.$^3$) | 55 |

We claim:

1. A molding composition comprising a compatible blend of: (a) a polycarbonate containing repeating units (I) having the formula:

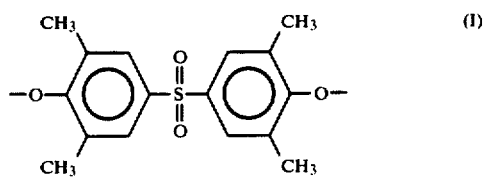

and, optionally, repeating units (II) having the formula:

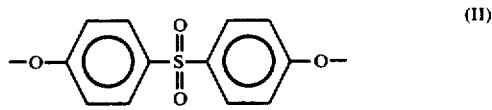

in which repeating units (I) and optionally repeating units (II) are connected by interbonding units derived from a carbonate precursor, and (b) a vinyl chloride derived polymer.

2. The molding composition of claim 1 wherein the polycarbonate comprises ordered, alternating repeating units have the formula

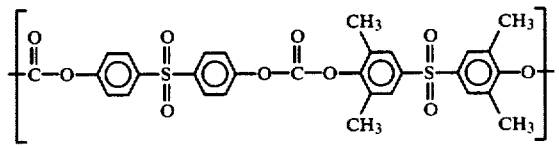

3. The molding composition of claim 1 wherein the vinyl chloride polymer is poly (vinyl chloride).

4. The molding composition of claim 1 wherein the vinyl chloride polymer is a copolymer of vinyl chloride with an olefinically unsaturated polymerizable compound.

* * * * *

UNITED STATES PATENT OFFICE
CERTIFICATE OF CORRECTION Page 1 of 2

Patent No. 4,698,390              Dated  October 6, 1987

Inventor(s) Lloyd M. Robeson; James E. Harris; James H. Kawakami; Louis M. Maresca It is certified that error appears in the above-identified patent and that said Letters Patent are hereby corrected as shown below:

PATENT

| Column | Line | |
|---|---|---|
| 3 | 25 | "polycarbonates in" should read --polycarbonates is-- |
| 6 | 9-10 | "employed in the blends employed in the blends" should read --employed in the blends-- |
| 6 | 28 | "TMBE" should read --TMBS-- |
| 6 | 45 | "dihroxy" should read --dihydroxy-- |
| 8 | 18-21 | PTO has omitted the sentence beginning--The vinyl chloride derived polymer can preferably be employed in an amount of from about 5 weight percent to about 95 weight percent more preferably from about 25 weight percent to about 75 weight percent, and most preferably from about 40 weight percent to about 60 weight percent.-- |
| 9 | 40 | "elastiometic" should read --elastomeric-- |
| 10 | 1 | "blends" should read --blend-- |
| 10 | 1 | "plycarbonate" should read --polycarbonate-- |
| 10 | 41 | "exposure electrical/" should read --exposure, electrical/-- |
| 10 | 44 | "as used" should read --As used-- |
| 11 | 6 | "that te" should read --that the-- |
| 11 | 34-35 | "Excess phosgene was diluted" should read --Excess phosgene was removed with a nitrogen sparge. The polymer was diluted-- |

UNITED STATES PATENT OFFICE
CERTIFICATE OF CORRECTION

Patent No. 4,698,390　　　　　　　　　　Dated October 6, 1987

Inventor(s) Lloyd M. Robeson; James E. Harris; James H. Kawakami; Louis M. Maresca It is certified that error appears in the above-identified patent and that said Letters Patent are hereby corrected as shown below:

PATENT

| Column | Line | |
|--------|------|---|
| 12 | 65 | "The combine" should read --The combined-- |
| 14 | 45 | "22 690" should read --22,690-- |

Signed and Sealed this

Fourteenth Day of June, 1988

Attest:

DONALD J. QUIGG

Attesting Officer　　　　Commissioner of Patents and Trademarks